US008482293B2

(12) United States Patent
 Tyan et al.

(10) Patent No.: US 8,482,293 B2
(45) Date of Patent: Jul. 9, 2013

(54) I/O CIRCUIT CALIBRATION METHOD AND ASSOCIATED APPARATUS

(75) Inventors: Eer-Wen Tyan, Hsinchu Hsien (TW); Ming-Chieh Yeh, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 317 days.

(21) Appl. No.: 12/889,017

(22) Filed: Sep. 23, 2010

(65) Prior Publication Data

US 2011/0074520 A1    Mar. 31, 2011

(30) Foreign Application Priority Data

Sep. 30, 2009    (TW) ................................ 98133229 A

(51) Int. Cl.
 *G01R 35/00* (2006.01)
(52) U.S. Cl.
 USPC ............................................................ 324/601
(58) Field of Classification Search
 USPC ............................................................. 324/601
 See application file for complete search history.

(56) References Cited

U.S. PATENT DOCUMENTS

| | | | | |
|---|---|---|---|---|
| 6,541,996 B1 * | 4/2003 | Rosefield et al. | ............... | 326/30 |
| 6,624,659 B1 * | 9/2003 | Abraham et al. | ............... | 326/82 |
| 6,836,144 B1 * | 12/2004 | Bui et al. | .......................... | 326/32 |
| 7,068,065 B1 * | 6/2006 | Nasrullah | ......................... | 326/30 |
| 7,612,578 B2 * | 11/2009 | Chang et al. | ..................... | 326/30 |
| 2003/0009304 A1 * | 1/2003 | Lawson | ......................... | 702/107 |
| 2004/0044808 A1 * | 3/2004 | Salmon et al. | ..................... | 710/8 |
| 2006/0097749 A1 * | 5/2006 | Ahmad et al. | ................... | 326/30 |
| 2008/0088338 A1 * | 4/2008 | Kim | .................................. | 326/30 |
| 2008/0143377 A1 * | 6/2008 | Cho et al. | ......................... | 326/30 |
| 2008/0211536 A1 * | 9/2008 | Nguyen et al. | ................... | 326/30 |
| 2009/0237109 A1 * | 9/2009 | Haig et al. | ........................ | 326/30 |
| 2009/0289658 A1 * | 11/2009 | Moon | .............................. | 326/30 |
| 2010/0001758 A1 * | 1/2010 | Dreps et al. | ...................... | 326/30 |

* cited by examiner

*Primary Examiner* — Patrick Assouad
*Assistant Examiner* — Demetrius Pretlow
(74) *Attorney, Agent, or Firm* — Edell, Shapiro & Finnan, LLC

(57) ABSTRACT

An I/O calibration method and an apparatus are provided for calibrating a driving impedance at an output end of an I/O circuit in a chip. The chip further includes a plurality of basic impedances and a non-volatile memory. The I/O circuit calibration method includes: measuring an impedance value of one basic impedance and recording the measured impedance value in the non-volatile memory; synthesizing a calibration impedance by selectively conducting the basic impedance(s); adjusting the number of the conducted basic impedance(s) in the calibration impedance and estimating an impedance value of the driving impedance according to the measured result and a voltage divided by the calibration impedance and the driving impedance at the output end.

16 Claims, 7 Drawing Sheets

I/O CIRCUIT CALIBRATION METHOD AND ASSOCIATED APPARATUS

CROSS REFERENCE TO RELATED PATENT APPLICATION

This patent application is based on Taiwan, R.O.C. patent application No. 098133229 filed on Sep. 30, 2009.

FIELD OF THE INVENTION

The present invention relates to an I/O circuit calibration method and an associated apparatus, and more particularly, to an I/O calibration method and associated apparatus that synthesizes a calibration impedance by an accurately measured basic impedance in a chip.

BACKGROUND OF THE INVENTION

Diversified electronic systems are one of the most important hardware foundations in the current information society. An electronic system generally integrates chips or devices of various functions with the aid of a circuit board (e.g., a printed circuit board) and/or transmission wires, in a way that data signals are exchanged between the chips to construct overall functions of the electronic system. Therefore, it is a research priority of a chip designer to provide solutions for enabling different chips to smoothly transmit/receive data signals.

To transmit a signal from one chip to another, it is necessary that the chip transmitting the signal have an appropriate signal driving capability, which drives at a receiving end of the chip via traces of the circuit board or/and transmission wires an appropriate signal waveform for representing information contained in the signal. In general, a large driving capability means a small corresponding driving impedance, and vice versa.

Since the driving impedance is a crucial reference and parameter for driving exchange signals in the signal transceiving mechanism, a tolerable range allowed in the driving impedance is established in certain signal exchange interface standards. For example, in the Joint Electron Devices Engineering Council (JEDEC) Double-Data-Rate (DDR) memory signal exchange interface standards, an impedance tolerable range for driving impedance is specified to maintain accuracy in signal exchange. Accompanied with the ever-increasing signal exchange frequency/speed, more limitations are imposed on the driving impedance such that the tolerable range is required to be still ever smaller.

In order to meet requirements in driving impedance, it is necessary to provide a solution for calibrating driving impedance in a current signal transceiving mechanism.

SUMMARY OF THE INVENTION

Therefore, the present disclosure provides an I/O calibration method and associated apparatus applied to an I/O circuit implementing a chip transceiving mechanism to calibrate a driving impedance at an output end of the I/O circuit, so that the driving impedance complies with the signal interface standard to ensure the accuracy in signal exchange.

The present disclosure provides a method for calibrating an I/O circuit in a chip. The I/O circuit comprises an output end, and the chip comprises a plurality of built-in basic impedances (e.g., resistors) and a non-volatile memory. The method according to the present disclosure comprises: measuring an impedance value of a basic impedance and recording the measured impedance value in the non-volatile memory in the chip; rendering a driving impedance at the output end of the I/O circuit; synthesizing a calibration impedance by selectively conducting a plurality of basic impedances in the chip; and estimating the impedance value of the driving impedance according to the calibration impedance to calibrate the I/O circuit.

In one embodiment of the invention, the chip is provided with a plurality of built-in basic impedances and a built-in reference basic impedance, wherein an impedance of the reference basic impedance equals to that of the basic impedances. The reference basic impedance is coupled to outside of the chip via a pad (e.g., a general purpose input/output (GPIO) pad) of the chip. To measure the impedance value of the basic impedances, the reference basic impedance is coupled to an external tester via the pad, such that the external tester is allowed to accurately measure the impedance value of the reference basic impedance to substantially in equivalence measure the impedance value of the basic impedances.

The basic impedances are respectively coupled to an I/O circuit (e.g., a reference I/O circuit) via a corresponding switch. To synthesize the foregoing calibration impedance, a certain number of basic impedances from the plurality of basic impedances are selected, and the switches corresponding to the selected basic impedances are conducted, so as to conduct the basic impedances to the output end to synthesize the calibration impedance.

The present disclosure is applicable for calibrating a pull-up driving impedance and a pull-down driving impedance. Supposing the reference I/O circuit and other I/O circuits operate between a first operating voltage and a second operating voltage, and the (reference) I/O circuit provides a driving impedance to be calibrated between the first operating voltage and its output end, the plurality of basic impedances according to the invention may then be arranged between the output end and the second operating voltage, so that the conducted basic impedances synthesize the calibration impedance between the output end and the second operating voltage. Thus, based on the calibration impedance and the driving impedance, voltage is divided between the first operating voltage and the second operating voltage to reflect a result from the voltage-dividing at the output end. By utilizing the calibration impedance, the impedance value of the driving impedance is estimated according to the output voltage at the output end. More specifically, the chip may comprise a built-in comparator for comparing the output voltage at the output end with a reference voltage. For example, the reference voltage is an average of the first and second operating voltages. When the output voltage is closer to the first operating voltage than the reference voltage is, it means that the driving impedance is smaller than the calibration impedance is; in contrast, when the output voltage is closer to the second operating voltage than the reference voltage is, it means that the driving impedance is greater than the calibration impedance. Accordingly, the impedance value of the driving impedance is approximated through narrowing down an impedance range by changing the impedance value of the calibration impedance.

For example, a first number of basic impedances are conducted to synthesize the calibration impedance, and the output voltage at the output end is compared with the reference voltage to obtain a first comparison result. A second number (different from the first number) of basic impedances are conducted to change the impedance value of the calibration impedance, and the output voltage is again compared with the reference voltage to obtain a second comparison result. Supposing the first and second comparison results differ from each other, it is inferred that the impedance value of the driving impedance is between the two impedance values respectively synthesized by the first number and second number of basic impedances. Since accurate resistance values of the basic impedances are in advance measured and stored in the built-in non-volatile memory of the chip, by simply reading the non-volatile memory, the impedance value of the synthesized impedance is easily acquired according to the accurate measurements in the non-volatile memory and the number of conducted basic impedances to narrow down the impedance value of the driving impedance between two impedance values of high accuracy. Therefore, according to the present disclosure, the impedance value of the driving impedance is estimated with high accuracy and/or resolution to calibrate the impedance value of the driving impedance.

In general, a driving impedance to be calibrated is a pull-up driving impedance when the first operating voltage is larger than the second operating voltage; vice versa, a driving impedance to be calibrated is a pull-down impedance when the first operating voltage is smaller than the second operating voltage. Therefore, the approach of the foregoing description may be implemented to the two types of driving impedances. In a complete calibration procedure, the two types of driving impedances are in sequence calibrated according to the present disclosure. As described, the driving impedance between the first operating voltage and the output end is first calibrated; in continuation, another driving impedance between the output end and the second voltage is then calibrated. Another plurality of basic impedances are arranged between the output end and the second operating voltage, and are selectively conducted to synthesize another calibration impedance between the first operating voltage and the output end, so as to estimate the another driving impedance according to the another calibration impedance.

According to the present disclosure, driving strengths of the I/O circuits (including the reference I/O circuit) can be modified according to a corresponding strength control, such that the impedance values of the driving impedance are correspondingly changed along with the strength controls. The driving impedance under various strength controls may then be calibrated according to the present disclosure. For example, the strength control of an I/O circuit is programmed as a first control value to provide a driving impedance corresponding to a first impedance value at an output end. With the above description of the present disclosure, the number of conducted basic impedances is modified to narrow down and estimate the first impedance value. The strength control is then modified to a second control value to correspondingly change the impedance value of the driving impedance to a second impedance value, which is similarly narrowed down and estimated as the first impedance value. Likewise, driving impedance values corresponding to different strength controls of the I/O circuits are calibrated by implementing the present disclosure. Once the calibration is completed, strength controls corresponding to the I/O circuits can be easily determined according to results from the calibration. For example, based on signal exchange requirements, in order to have a driving strength value of a specific I/O circuit be compliant to a predetermined range, an appropriate strength control is selected accordingly to ensure the accuracy in signal exchange.

In one embodiment of the present disclosure, an external tester is connected via a pad to precisely measure an impedance value of a basic impedance before a chip is shipped out of the factory. When the chip is integrated to an electronic system, calibration according to the present disclosure is performed at power on of the chip to estimate corresponding impedance values of driving impedances under different strength controls, so that correct strength controls can be selected for the I/O circuits in actual signal exchange situations.

The present disclosure further provides a chip for realizing the foregoing method according to the present disclosure. The chip comprises a reference basic impedance and a corresponding pad (e.g., a GPIO pad), a plurality of basic impedances and a plurality of corresponding switches, a plurality of matching I/O circuits and a reference I/O circuit, a non-volatile memory and a corresponding scheduler, a comparator, and a controller. The impedance value of the reference impedance equals to the impedance values of the basic impedances. The pad corresponding to the reference basic impedance couples the reference basic impedance to an external tester, which measures the impedance of the reference basic impedance and writes a measured result to the non-volatile memory. Each of the switches, corresponding to a basic impedance, selectively conducts the basic impedance to an output end of the (reference) I/O circuit. The controller selects a number from the plurality of basic impedances and closes the switches corresponding to the selected switches, so as to synthesize corresponding calibration impedance by to the output end conducting the number of selected basic impedances.

Operations and arrangements of circuits in the chip shall be discussed below. Each of the I/O circuit and the reference circuit comprises an output end, and operates between a first operating voltage and a second operating voltage while providing a driving impedance between the first voltage and the output end (e.g., the output end of the reference I/O circuit). Using the switches controlled by the controller, the basic impedances are selectively conducted between the output end and the second operating voltage, and the conducted basic impedances thus synthesizing a calibration impedance between the output end and the second operating voltage. Thus, voltage is divided between the first and second operating voltages based on the driving impedance and the calibration impedance to reflect a result of the voltage dividing to a voltage at the output end, so that the controller according to the present disclosure is allowed to estimate the impedance value of the driving impedance according to the output voltage at the output end. The comparator compares the output voltage with a reference voltage to render a comparison result, based on which the controller estimates the impedance value of the driving impedance. For example, the reference voltage is an average of the first and second operating voltages. When the output voltage is closer to the first operating voltage than the reference voltage is, it means that the driving impedance is smaller than the calibration impedance; in contrast, when the output voltage is closer to the second operating voltage than the reference voltage is, it means that the driving impedance is greater than the calibration impedance. Accordingly, the impedance value of the driving impedance is approximated through narrowing down an impedance range by changing the impedance value of the calibration impedance.

For example, the calibration impedance is synthesized by conducting a first number of basic impedances, and the output voltage at the output end is compared with the reference voltage to obtain a first comparison result. A second number (different from the first number) of basic impedances are conducted to change the impedance value of the calibration impedance, and the output voltage is again compared with the reference voltage to obtain a second comparison result. Supposing the first and second comparison results differ from each other, it is inferred that the impedance value of the driving impedance is between the two impedance values respectively synthesized by the first number and second number of basic impedances.

The controller according to the present invention can also be implemented to calibrate pull-up and pull-down impedances. In continuation to the foregoing description, given that another driving impedance is provided between the output end and the second voltage is then calibrated, another plurality of basic impedances and a plurality of corresponding switches can be arranged between the first operating voltage and the output end. The controller then synthesizes another calibration impedance by selectively conducting the basic impedances. With such arrangement, the controller is able to calibrate the impedance value of the another driving impedance according to the comparison result of the comparator.

According to the chip of the present disclosure, driving strengths of the I/O circuits (including the reference I/O circuit) can be modified according to a corresponding strength control. For example, the controller programs the strength control as a first control value, and calibrates the driving impedance corresponding to the first impedance value. The strength control is then modified to a second control value to correspondingly change the impedance value of the driving impedance to a second impedance value, which is similarly narrowed down and estimated as the first impedance value. Likewise, driving impedance values corresponding to different strength controls of the I/O circuits by implementing the present disclosure. Once the calibration is completed, strength controls corresponding to the I/O circuits can be easily determined according to results from the calibration. For example, based on signal exchange requirements, in order to have a driving strength value of a specific I/O circuit be compliant to a predetermined range, the controller selects an appropriate strength control accordingly to ensure the accuracy in signal exchange.

In one embodiment of the present disclosure, an external tester is connected to the chip of the present disclosure to precisely measure an impedance value of a basic impedance before a chip is shipped out of the factory. When the chip is integrated with an electronic system, the controller reads measured results recorded in the non-volatile memory at power-on of the chip, acquires synthesized calibration impedances according to the measured results, and estimates corresponding impedance values of driving impedances under different strength controls, so that correct strength controls can be selected for the I/O circuits in actual signal exchange situations.

According to the present invention, a calibration impedance, synthesized by selectively conducting a plurality of built-in basic impedances, is equivalent to a calibration impedance with an adjustable resistance value. When the impedance value of the (reference) basic impedances is measured by an externally connected tester, the impedance value is in equivalence obtained by measuring the adjustable impedance resolution of the calibration impedance since variances in the calibration impedance can be inferred by the impedance value of the basic impedances. Therefore, the present disclosure further provides a method for calibrating an I/O circuit by utilizing an adjustable built-in calibration impedance of a chip. The method comprises adjusting an impedance value of the calibration impedance, and estimating an impedance value of a driving impedance according to the impedance value of the calibration impedance to calibrate the I/O circuit of the chip.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
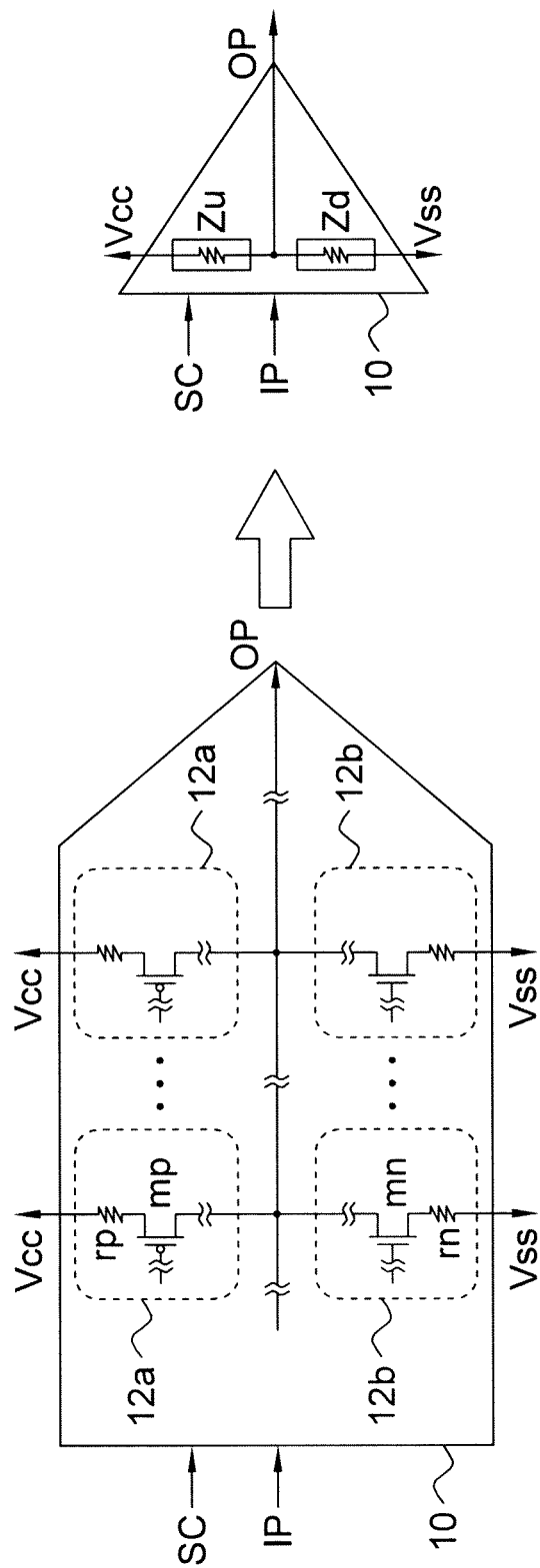
FIG. 1 is a schematic diagram of an exemplary I/O circuit.

FIG. 1 shows a schematic view of an embodiment of an I/O circuit 10. The I/O circuit operates between operating voltages Vcc and Vss to realize a signal transceiving mechanism at a signal exchange interface. For example, the operating Vss is a ground voltage, and the operating voltage Vcc is a positive voltage higher than the ground voltage. The I/O circuit 10 receives an input IP and a strength control SC, and drives a corresponding signal at its output end OP according to the input IP. The driving capability of the signal at the output end OP of the I/O circuit is adjustable using the strength control SC. The I/O circuit 10 comprises a plurality of driving units 12a and 12b for respectively pushing and pulling signal output. For example, each of the driving units 12a comprises a resistor rp and a p-channel metal oxide semiconductor field effect transistor (MOSFET) mp; each of the driving units 12b similarly comprises a resistor rn and an n-channel MOSFET. Each of the driving units 12a and 12b is selectively conducted to the output end OP to adjust the signal driving capability of the I/O circuit 10. For example, as the number of conducted driving units 12a and 12b gets large, the signal driving capability of the I/O circuit 10 increases accordingly.

The I/O circuit 10 renders an equivalent output impedance at the output end OP, as shown in FIG. 1. For example, when the input IP is logic 1, the I/O circuit 10 renders at its output end OP an equivalent impedance (mainly electrical impedance), which is a pull-up impedance, represented by a driving impedance Zu; when the input IP is logic 0, the I/O circuit 10 renders between the output end OP and the operating voltage Vss another equivalent output impedance, which is a pull-down impedance, represented by a driving impedance Zd. As described previously, the signal driving capability is adjustable, and thus the driving impedances Zu and Zd that the I/O circuit 10 renders at its output end OP are changed along with adjustments in the signal driving capability. In other words, the impedance values of the driving impedances Zu and Zd can be regarded as functions of the strength control Sc.

Figure 2:
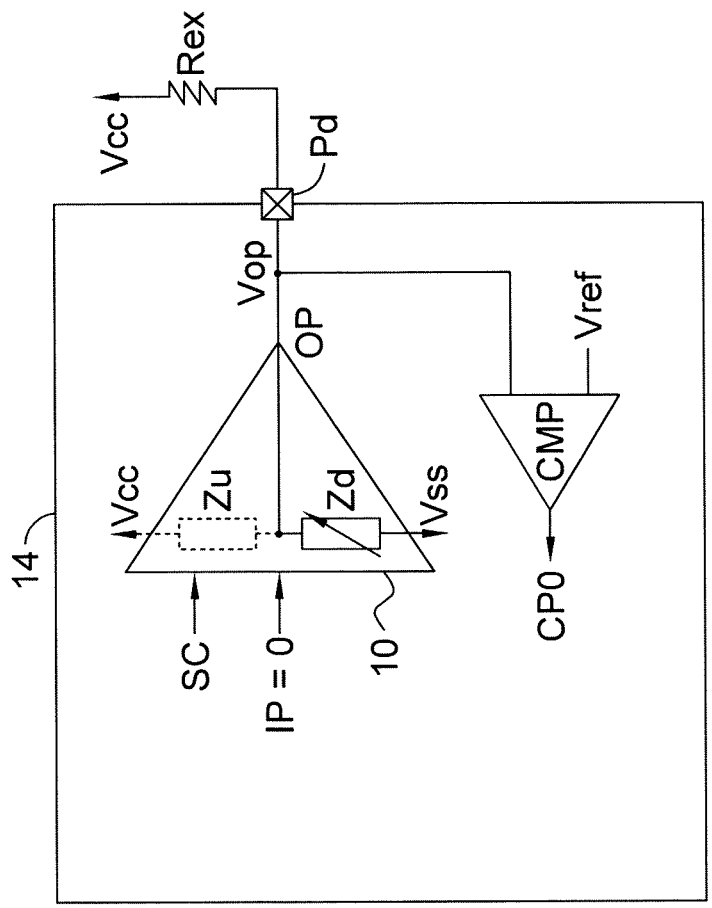
FIG. 2 is a schematic diagram of calibrating the I/O circuit in FIG. 1 by utilizing a solution associated with the prior art.

As described previously, it is necessary to calibrate the driving impedance of the I/O circuit in order to maintain the accuracy in signal exchange. FIG. 2 shows a schematic diagram of the I/O circuit 10 in a chip 14 to be calibrated using a solution associated with the prior art. For calibration purposes, the chip 14 is especially provided with a pad Pd for connecting the output end OP externally to a precision resistor Rex. The conventional calibration process shall be described below. At power-on of the chip 14, the input IP of logic 0 is fed into the I/O circuit 10 so that between the output end OP and the operating voltage Vss of the I/O circuit 10 is an equivalent impedance Zd. Thus, voltage dividing based on the external resistor Rex and the driving impedance Zd is carried out between the operating voltages Vcc and Vss, with a result from the voltage dividing reflected to a voltage Vop at the output end OP. A comparator CMP compares the voltage Vop with a reference voltage Vref to obtain a comparison result CP0, which reflects an impedance value of the driving impedance Zd. For example, the reference voltage Vref is an average of the operating voltages Vcc and Vss, and when the voltage Vop is greater than the reference voltage Vref, it means that the impedance value (i.e., resistance value) of the driving impedance Zd is greater than the external resistor Rex.

Supposing the resistance value of the external resistor Rex is an ideal value of the driving impedance Zd, the conventional calibration method keeps changing the strength control SC to further change the impedance value of the driving impedance Zd until the comparison result reverses. For example, supposing when the strength control SC is a first control value sc1, the comparison results CP0 indicates that the external resistor Rex is greater than the corresponding driving impedance Zd (sc1); supposing when the strength control SC is a second control value sc2 different from the first control value sc1, the comparison result CP0 reverses to indicate that the external resistor Rex is smaller than a current driving strength Zd (sc2)—such condition indicates that an ideal strength control SC falls between the first control value sc1 and the second control value sc2. However, it is mentioned in the discussion related to FIG. 1 that, the control value of the strength control SC is discretely quantized. When no other control values between the control values sc1 and sc2 are available, i.e., the control values sc1 and sc2 are two adjacent numbers that are the closest to the ideal control strength SC, the conventional calibration method is only given choices to select between the two control values sc1 and sc2 to have the driving impedance Zd approximate the value of the external resistor Rex. In this case, even if the resistance value of the external resistor Rex is very accurate, the conventional calibration method can only be sure that an error between the driving impedance Zd (sc1) and the external resistor Rex is between |Zd (sc1)–Zd (sc2)| such that the impedance value of the driving impedance Zd (sc1) cannot be calibrated more precisely due to the error. Similarly, the conventional calibration method is only capable of estimating an error between the driving impedance Zd (sc2) and the external resistor Rex by taking the error |Zd (sc1)–Zd (sc2)| into account. More specifically, a calibration resolution (and/or accuracy) of the conventional calibration method in FIG. 2 is determined by a resolution of the controlled change in the driving impedance Zd. For example, when the driving impedance Zd is controlled to change 10% in response to the change between the two adjacent quantized control values of the strength control SC, it means that an error of the calibration resolution is also to 10% to restrict the accuracy of the calibration resolution.

Once the driving impedance Zd is calibrated, the convention calibration method calibrates another driving impedance Zu based on the calibrated impedance Zd, i.e., the impedance value of the driving impedance Zu is calibrated based on the driving impedance Zd using the strength control SC. However, since the calibration on the driving impedance Zu is based on the driving impedance Zd, the calibration resolution (i.e., accuracy) of the driving impedance Zu cannot be higher than that of the driving impedance Zd. More specifically, for either the driving impedance Zd or the impedance Zu, the calibration resolution of the conventional solution, being restricted by the resolution of the controlled change of the quantized driving impedance, is inadequate. Further, an additional pad Pd is needed in the conventional calibration method for connecting to the external precision resistor Rex, such that in addition to increasing time and cost in circuit assembly, resources of not only the pins of the chip 14 but also circuit arrangement of the circuit board are wasted.

Figure 3:
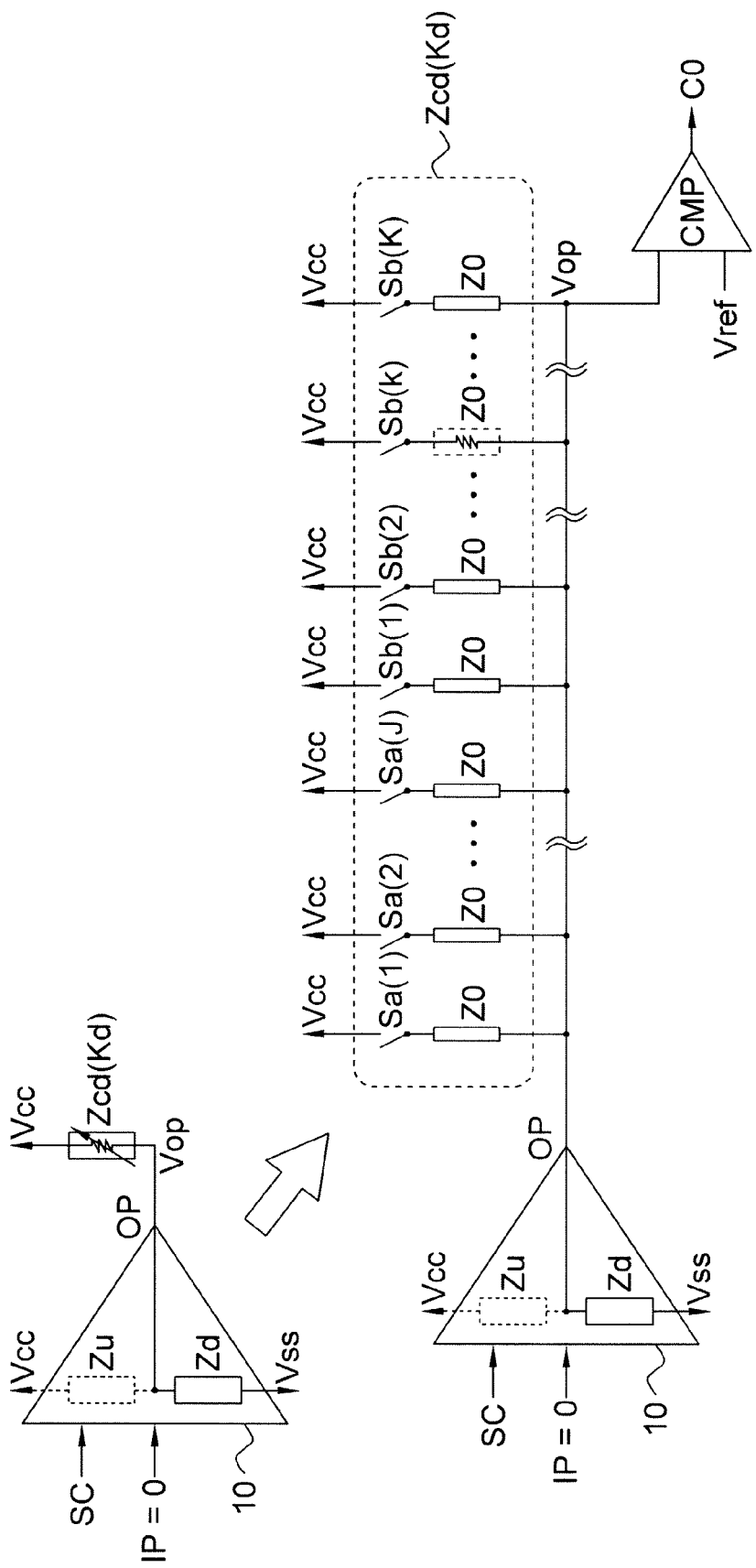
FIGS. 3 and 4 are schematic diagrams of calibrating the I/O circuit in FIG. 1 by utilizing techniques of the present disclosure.
Figure 4:
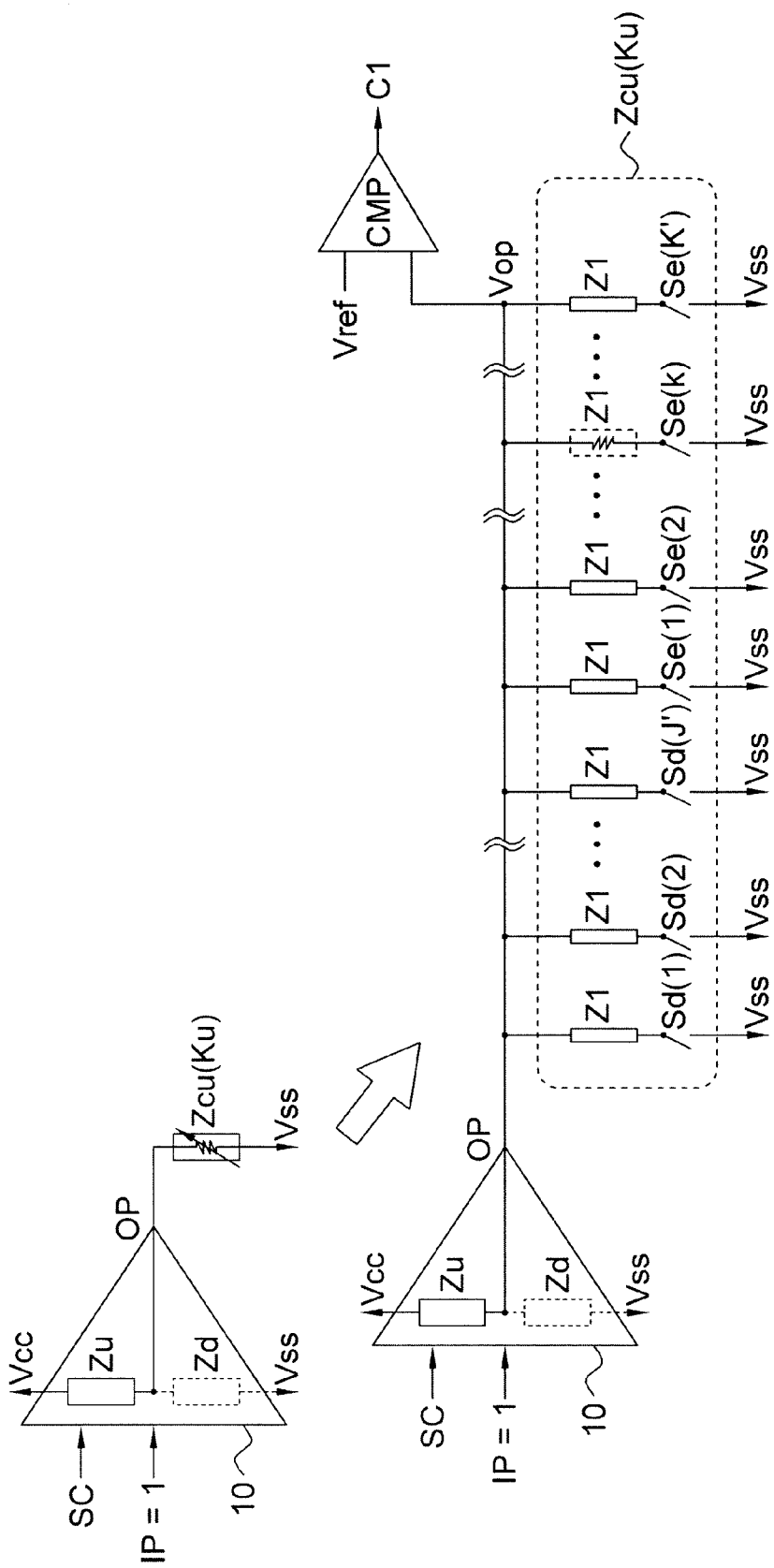

To overcome the drawbacks associated with the conventional calibration method shown in FIG. 2, the present disclosure provides a built-in adjustable calibration impedance in a chip to calibrate a driving impedance of an I/O circuit. FIGS. 3 and 4 show schematic diagrams of structures for calibrating a pull-down impedance and a pull-up impedance of the I/O circuit 10 according to one embodiment of the present disclosure, respectively. As shown in FIG. 3, to calibrate the driving impedance Zd, a built-in adjustable calibration impedance Zcd (e.g., a resistor with an adjustable resistance value) is provided between the output end OP of the I/O circuit 10 and the operating voltage Vcc. An impedance value (e.g., a resistance value) of the calibration impedance Zcd is controlled by a calibration control Kd. FIG. 3 also shows one embodiment of the calibration impedance Zcd. The calibration impedance Zcd comprises a plurality of built-in basic impedances Z0 with an equal impedance value (e.g., the basic impedances are resistors with an equal resistance value) and a plurality of corresponding low-impedance switches Sa(1) to Sa(j), and Sb(1) to Sb(K), where J and K are integral constants. Each of the switches and its corresponding basic impedance Z0 are coupled between the output end OP and the operating voltage Vcc. The switches respectively control the corresponding basic impedances Z0 according to the calibration control Kd to whether to conduct to the output end OP, such that the conducted basic impedances synthesize the calibration impedance Zcd between the operating voltage Vcc and the output end OP. More specifically, the switches are selectively closed according to the calibration control Kd to change the number of basic impedances to further adjust a total impedance value that the calibration impedance Zcd renders at the output end OP.

For example, the switches Sa(1) to Sa(J) are kept closed, so that the corresponding basic impedances Z0 is constantly conduct to the output end OP; the switches Sb(1), . . . , Sb(k) to Sb(K) are provided as a ladder resistance control. For example, the digital calibration control Kd has its least significant bit (LSB) control the conducting of the switch Sb(1), its next higher bit control the conducting of the two switches Sb(2) and Sb(3), its next higher bit control the conducting of the four switches Sb(4) to Sb(7), and its next higher bit control the conducting of the eight switches Sb(8) to Sb(15), and so forth.

Since the calibration impedance Zcd is coupled between the operating voltage Vcc and the output end OP, when the input IP of the I/O circuit 10 is logic 0, the driving impedance Zd of the I/O circuit 10 and the calibration impedance Zcd connected in series cause voltage dividing between the operating voltages Vcc and Vss to reflect a result of voltage dividing as the voltage Vop at the output end OP. The voltage Vop is compared with a reference voltage Vref (e.g., (Vcc+Vss)/2) by a comparator CMP to render a comparison result C0, which reflects a relationship between the calibration impedance Zcd and the driving impedance Zd. During calibration, the strength control SC is first fixed at a control value sc1, under which the calibration control Kd is continuously adjusted to change the impedance value of the calibration impedance Zcd, with all comparison results observed and recorded. When the comparison result reverses, the impedance value Zd (sc1) for the control value sc1 may then be narrowed down and estimated. For example, suppose the comparison result C0 indicates that the driving impedance Zd (sc1) is greater than a current calibration impedance Zcd (kd1) when a control value kd1 of the calibration impedance Kd, and the comparison result C0 reverses to indicate that the driving impedance Zd (sc1) is smaller than a current calibration impedance Zcd (kd2) when the calibration impedance Kd is changed to another control value kd2. Thus, it is inferred that the impedance value of the driving impedance Zd (sc1) is between Zcd (kd1) and Zcd (kd2).

In the embodiment shown in FIG. 3, the calibration control Kd of the present disclosure is also quantized, meaning that a calibration resolution (accuracy) of the driving impedance Zd is controlled by a resolution of the control change in the calibration impedance Zcd. Therefore, the present invention effectively increases the calibration resolution of the driving impedance Zd for that a high accuracy of the calibration impedance Zcd can be provided. For example, with an appropriate structure, supposing that the resolution of the control change in the calibration impedance Zcd is as accurate as 1%, it means that the calibration of the driving impedance Zd can reach as fine as 1% according to the present disclosure.

After calibrating the driving impedance Zd (sc1) by adjusting the calibration impedance Zcd, according to the present disclosure, the control value of the strength control SC is changed to another control value sc2, and the corresponding driving impedance Zd (sc2) is narrowed down and estimated by adjusting the calibration impedance Zcd. Similarly, by adjusting the built-in calibration impedance Zcd of the present disclosure, the driving impedance Zd corresponding to different strength control values are accurately calibrated.

In the embodiment shown in FIG. 4, a built-in adjustable calibration impedance Zcu is provided between the output end OP and the operating voltage Vss according to the present disclosure. When the input IP of the I/O circuit 10 is logic 1, the pull-up impedance Zu of the I/O circuit 10 and the calibration impedance Zcu are connected in series to cause voltage dividing between the operating voltages Vcc and Vss to reflect a result of the voltage dividing as the output voltage Vop at the output end OP. The voltage Vop is compared with the reference voltage Vref by the comparator CMP to render to a comparison result C1, which reflects a relationship between the driving impedance Zu and the calibration impedance Zcu. Similar to the embodiment shown in FIG. 3, the calibration impedance Zcu in FIG. 4 also comprises a plurality of switches Sd(1) to Sd(J'), Se(1) to Se(K'), and a plurality of corresponding basic impedances Z1, where J' and K' are integral constants. The switches are selectively closed according to the calibration impedance Ku to conduct the corresponding basic impedances Z to the output end OP to further adjust the total impedance value of the calibration impedance Zcu. The impedance value of the basic impedances Z1 may be equal to that of the basic impedances Z0 in FIG. 3. Principles of calibration of the structure shown in FIG. 4 are substantially the same as those of the embodiment shown in FIG. 3—the strength control is first fixed to a control value sc1 and the impedance value of the calibration impedance Zcu is continuously adjusted to calibrate the impedance value Zu (sc1), and a driving impedance Zcu (sc2) under another control value sc2 is similarly calibrated, and so forth.

With the above discussion on FIGS. 3 and 4, some noticeable differences between the present disclosure and the conventional calibration method in FIG. 2 are observed. The conventional calibration method in FIG. 2, through constantly changing the driving impedance Zd by adjusting the strength control, calibrates the driving impedance Zd in conjunction with the external resistor Red. However, taking the embodiment in FIG. 3 for example, according to the present disclosure, the built-in calibration impedance Zcd is constantly changed by adjusting the calibration control Kd to calibrate the driving impedance Zd under a fixed strength control. As far as the conventional method in FIG. 2 is concerned, due to the inadequacy of the resolution of the change in the driving impedance Zd, the resolution and accuracy of the conventional calibration method are also restricted. Since the resolution of the change in the driving impedance Zd is closely associated with circuit structures, power consumption, resonance speed and a layout area of the I/O circuit, it is unlikely that an overall design of the I/O circuit be modified to merely increase the calibration resolution. In contrast, the calibration resolution according to the present invention is dominated by the adjustable impedance value of the built-in calibration impedance Zcd, which is tailored for calibration without compromising to other circuit designs of the I/O circuit, so that the resolution of the calibration impedance is capable of reaching a high accuracy to significantly increase the calibration resolution and accuracy of the calibration method according to the present disclosure.

Further, the method in FIG. 2 calibrates another driving impedance Zu based on the calibrated driving impedance Zd, which means that the calibration resolution of the driving impedance Zu is also limited. In contrast, another driving impedance Zu is independently calibrated from the driving impedance Zd so that the calibration resolutions of the driving impedances Zd and Zu are both effectively increased.

It is to be noted that, the calibration impedances Zcd in FIG. 3 and Zcu in FIG. 4 are built-in a same chip as the I/O circuit 10, and hence the chip need not be provided with an exclusive pad Pd for connecting to the external resistor Rex to further save resources and cost of the chip and the circuit board.

It is appreciated from the embodiments in FIGS. 3 and 4 that, the impedance values of the calibration impedances Zcd and Zcu are jointly determined by the impedance value (e.g., resistance value) of the corresponding basic impedances Z0 and Z1, and the number of conducted basic impedances. On account of the basic impedances being built in the chip, the impedance values of the basic impedances may vary along with process drift. To obtain precise impedance values of the basic impedances in a chip, the impedance values of the basic impedances in the chip are first accurately measured by utilizing an externally connected tester before leaving the factory, and measured impedance values are written (e.g., recorded and/or burned) into a non-volatile memory in the chip. When the chip is integrated with a circuit board to begin to operate, the impedance values of the basic impedances are read from the non-volatile memory, so that impedance values of the driving impedances Zd and Zu can be estimated in cooperation with the impedances values read from the non-volatile memory and the number of conducted basic impedances under respective calibration controls Kd and Ku to complete calibration of the driving impedances.

Figure 5:
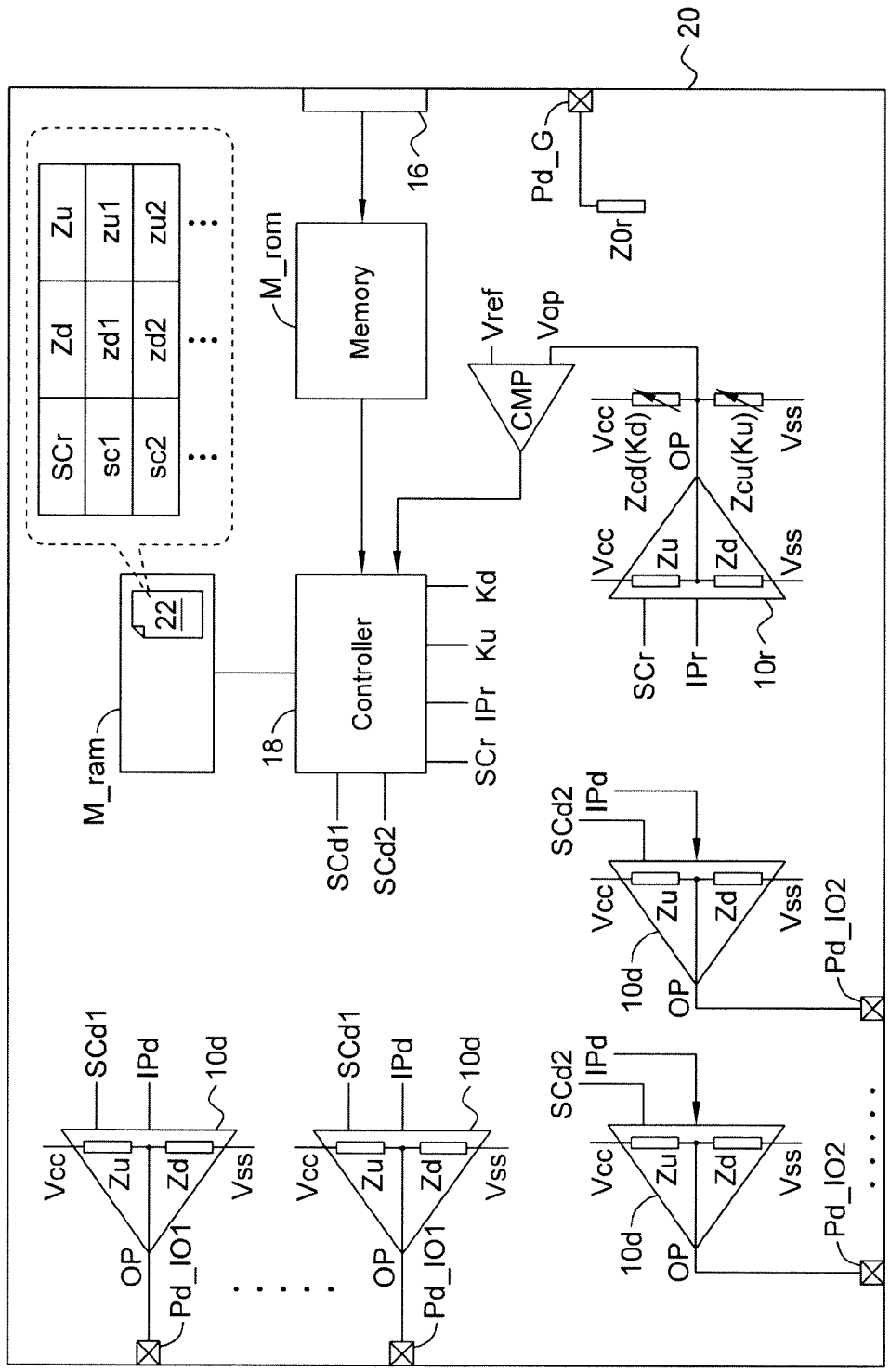
FIG. 5 is a schematic diagram illustrating application of the techniques in FIGS. 3 and 4 to a chip.

FIG. 5 shows a schematic view of the calibration method of the present invention applied to a chip 20 according to one embodiment of the present disclosure. The chip 20 comprises a reference basic impedance Z0r and a corresponding pad Pd_G (e.g., a GPIO pad), a plurality of basic impedances Z0 and Z1 for respectively synthesizing the calibration impedances Zcd and Zcu and a plurality of corresponding switches (as depicted in FIGS. 3 and 4, respectively), a plurality of matching I/O circuits 10d and a reference I/O circuit 10r, a non-volatile memory M_rom and a corresponding scheduler 10, a comparator CMP, a controller 18, and a volatile memory M_ram for supporting operations of the controller 18. The I/O circuits 10d are not limited to being I/O circuits of a same size; an impedance value of the reference basic impedance Z0r equals to impedance values of the basic impedances Z0 and Z1; and the pad Pd_G corresponding to the reference basic impedance Z0r couples the reference basic impedance Z0r to an external tester (not shown in FIG. 5), so that the tester can test the impedance value of the reference basic impedance Z0r and writes the measured impedance value into the non-volatile memory M_rom via the scheduler 16. Using the measured impedance value of the reference basic impedance, impedance values of the other basic impedances Z0 and Z1 are in equivalence obtained. When recording the impedance values, a look-up table in which the impedance values are assigned with different codes is first established. For example, an impedance value of 8 ohms is given a code of "0100", and the codes corresponding to the impedance values measured by the external tester are written into the non-volatile memory. The non-volatile memory is realized by a flash memory, or an EEPROM memory, or is realized by a special molten fuse (e.g., e-fuse). Since a chip is commonly provided with a built-in non-volatile memory (e.g., a non-volatile memory for storing firmware), the existing non-volatile memory may also be utilized to record the impedance values of the basic impedances. Further, as a common chip is also generally provided with a several GPIO pads, the pad Pd_G corresponding to the reference basic impedance may also be realized by a readily available GPIO pad but need not an exclusive pin.

In the chip 20, the reference I/O circuit 10r matches with each of the I/O circuits 10d. More specifically, the process parameters, circuit and layout structures of the reference I/O circuit 10r and the I/O circuits 10d, and the reference I/O circuit 10r and the I/O circuits 10d both operate between the operating voltages Vcc and Vss. Each of the I/O circuits 10d is coupled to a pad Pd_IO1 or a pad Pd_IO2 (e.g., an I/O pad) to realize a signal exchange interface of the chip 20 to transmit/receive signals. Further, the I/O circuits 10d may also receive a corresponding input IPd and strength controls SCd1 and SCd2. The reference I/O circuit 10r, exclusively used for calibration, is realized by the calibration structures in FIGS. 3 and 4. That is, the calibration impedance Zcd in FIG. 5 is the calibration impedance Zcd synthesized by the basic impedances Z0 and the corresponding switches, and also has its impedance value controlled by the calibration control Kd; the calibration impedance Zcu in FIG. 5 is realized by the calibration impedance Zcu in FIG. 4, and also has its impedance value controlled by the calibration control Ku. The controller 18 is for controlling operations the overall structure of the present disclosure. Via the calibration controls Ku or Kd, the controller 18 selects a number of basic impedances from the plurality basic impedances and closes the switches corresponding to the selected basic impedances, so that the corresponding calibration impedance Zcu (Ku) or Zcd (Kd) are synthesized by conducting the selected basic impedances to the output end OP of the reference I/O circuit 10r. Further, the controller 18 also controls the strength control SCd1 or SCd2 of the I/O circuits 10d, and the input IPr and the strength control SCr of the reference I/O circuit 10r.

The controller 18 according to the present disclosure is capable of calibrating the driving impedances Zd and Zu under different strength controls by utilizing the calibration controls Kd and Ku, the strength control SCr and the input IPr. Operation principles of the controller 18 are described with reference to FIGS. 3 and 4, and shall be omitted for brevity. The controller 18 may store calibration results in form of another look-up table 22 into the memory M_ram. As shown in FIG. 5, the look-up table 22 lists impedances values corresponding to various Za and Zu under different strength controls SCr. For example, when the strength control SCr is a control value sc1, the impedance value (e.g., resistance value) of the driving impedance Zd is zd1, and the impedance value (e.g., resistance value) of the driving impedance Zu is zu1, and so forth.

When the chip 20 according to the present disclosure wishes to drive and transmit a signal after the calibration is completed, the controller 18 determines a strength corresponding to the I/O circuits 10d from the strength controls SCd1 or SCd2 according to the calibration results (the look-up table 22) and the driving impedance requirements of the I/O circuits 10d. For example, supposing the pads Pd_IO1 are for realizing a first signal exchange interface according to signal exchange requirements, and the driving impedances of the I/O circuits 10d connected to the pads Pd_IO1 ought to be within a predetermined range, the controller 10 obtains according to the calibration results (the look-up table 22) the strength control value under which the driving impedance matches the predetermined range best, and selects from the strength control SCd a control value for best controlling the I/O circuit 10 to ensure the accuracy in signal exchange. Similarly, supposing the pads Pd_IO2 are for realizing a second signal exchange interface, the impedance values of driving impedance may be different from those of the first signal exchange interface, and controller 18 is still able to select a preferred control value of the strength control SCd2 from the look-up table 22 to control the corresponding I/O circuit 10d.

Figure 6:
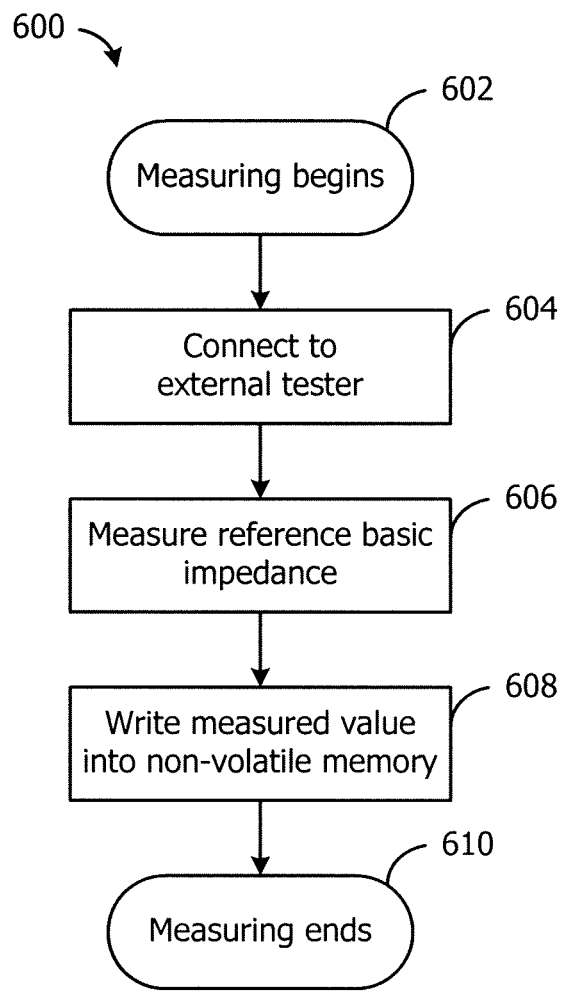
FIGS. 6 and 7 are flowcharts of a calibration method in accordance with the chip in FIG. 5 of the present disclosure.
Figure 7:
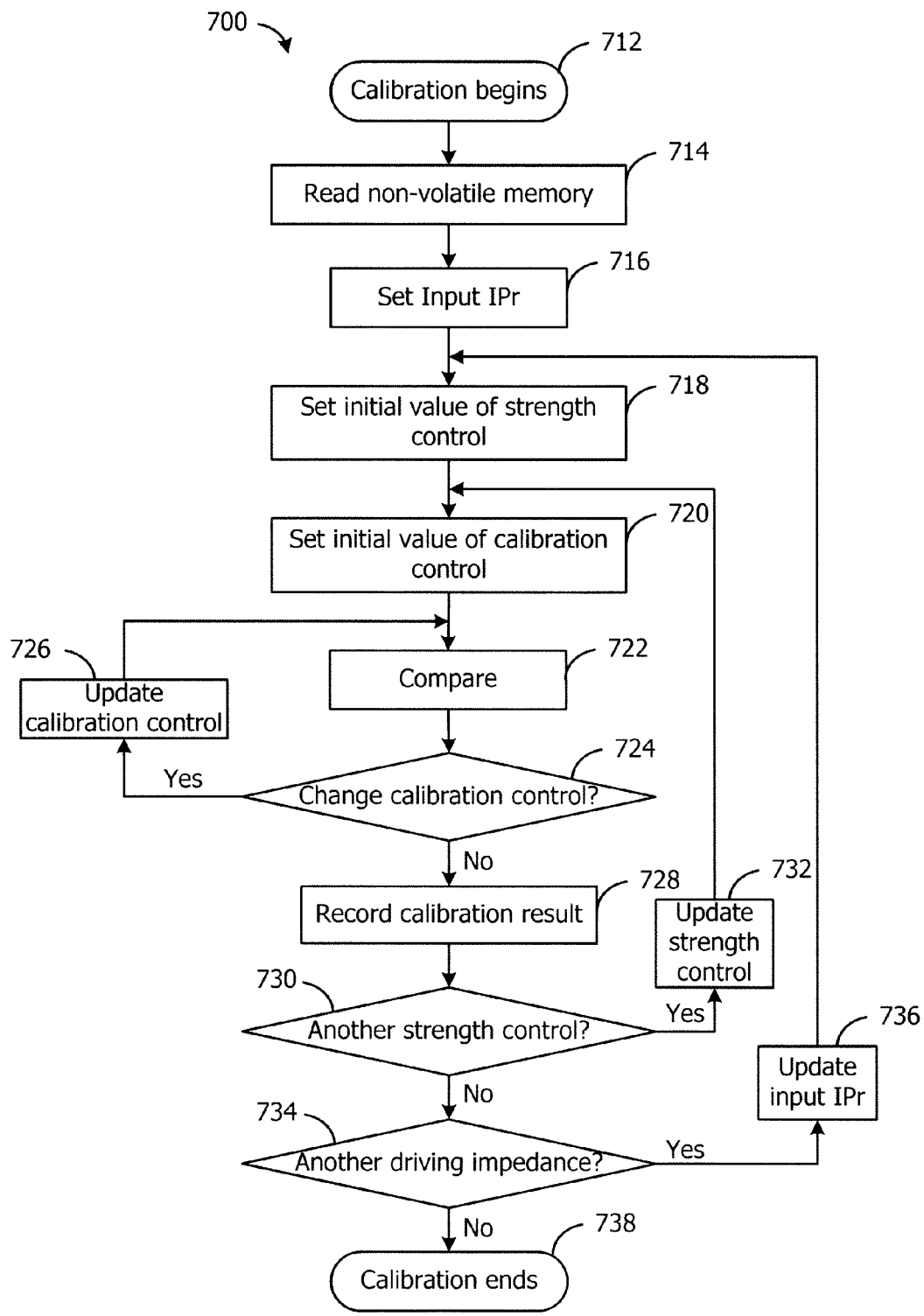

In continuation of the embodiments described in FIGS. 3 to 5, an operating flow of the chip 20 and the controller 18 of the present disclosure are described in embodiments of FIGS. 6 and 7. FIG. 6 shows a measuring flow 600 that is to be described below. In Step 602, an impedance value of a basic impedance is measured, i.e., the impedance value of the reference basic impedance Z0r is measured. In Step 604, an external tester is connected to a pad Pd_G. In Step 606, the impedance value of the reference basic impedance is measured by the tester. In Step 608, a measured result is written into the non-volatile memory M_rom via the scheduler 16. In Step 610, the measuring of the basic impedance ends.

In the flow 600, the Steps 602 to 610 may be performed before or after assembly before leaving the factory. Testing performed by an external tester is a common and mandatory procedure before all chips leave the factory, and thus the Steps 602 to 610 are merely an additional simple testing step that hardly adds much effort to testing procedure before leaving the factory. With the measured results from the flow 600, a flow 700 in FIG. 7 may be performed. The flow 700 is a calibration flow to be described below.

The calibration flow begins at Step 712. The calibration procedure may be performed at power-on of the chip 20 after the chip 20 is integrated into an electronic system. In Step 714, the basic impedance value (i.e., the measured result from the flow 600) is read from the non-volatile memory M_rom to serve as a reference for the calibration flow 700. The read impedance value is temporarily stored into the volatile memory M_ram. In Step 716, the input IPr of the reference I/O circuit 10r is set to determine whether to calibrate the driving impedance Zd or Zu. For example, with reference to FIG. 3, the input IPr is set to logic 0 supposing the driving impedance Zd is to be calibrated first. In Step 718, an initial value of the strength control SCr is set. In Step 720, an initial value of the calibration control Kd (or Ku) is set. In equivalence, it is to determine the number of basic impedances to be conducted as the calibration impedance. In Step 722, with reference to the foregoing description, the calibration impedance and the driving impedances (Zcd and Zd, or Zcu and Zu)

cause voltage dividing between the operating voltages Vcc and Vss, with a result of the voltage dividing reflected at the output end OP of the reference I/O circuit $10r$. A comparator CMP compares the output voltage at the output end OP with a reference voltage Vref to render a comparison result, which reflects a relationship between the calibration impedance and the driving impedances. In Step 724, it is determined whether the control value of the calibration control is to be changed for another comparison. The flow proceeds to Step 726 in which the calibration control is updated when another comparison is to be carried out; or else, the flow proceeds to Step 728. For example, Step 728 is performed when all the quantized control values (or valid control values within a reasonable range) of the calibration control are used for changing the impedance value of the calibration value, and the corresponding comparisons are completed. Alternatively, under reasonable circumstances, when no other calibration control values are desired for comparison, Step 728 may also be performed. As mentioned above, in Step 726, the control value of the calibration control is updated to iterate Step 722 to continuously adjust the impedance value of the calibration impedance by changing the number of conducted basic impedance in the calibration impedance to continue in driving impedance calibration. In Step 728, a calibration result obtained is recorded. For example, the calibration result and its corresponding strength control are recorded into the look-up table 22, as completing an entry of the look-up table 22.

The iteration of Steps 722, 724 and 726 may be proceeded by following rules below. When the calibration control is set in Step 720, the calibration impedance value is set to a maximum value, and Step 722 then follows for comparison. To set the calibration impedance value to a maximum value, for example, a least number of basic impedance in the calibration impedance are conducted. Taking the calibration impedance Zcd in FIG. 3 as an example, the switches Sa(1) to Sa(J) are closed while other switches are open. When Step 722 is performed from Step 726 following Step 724, the calibration impedance is adjusted to a minimum value, for example, the largest number of basic impedances in the calibration impedance are conducted. In the event that the latter comparison result does not reverse from the former, it means that the driving strength under this strength control is beyond a range that can be calibrated. Therefore, the flow is directed to Step 728 after Step 724 to record the driving impedance as calibration unsuccessful. Vice versa, in the event that the latter comparison result reverses from the former, it means that the driving impedance is within a range that can be calibrated, and so iteration of Steps 724, 726 and 722 is carried out to repeated1y change the calibration impedance with finer control values to narrow down and estimate the impedance value of the driving impedance. Alternatively, in the rule above, the calibration impedance in Step 720 may be first adjusted to a minimum value and then to a largest value when iterated, and a same outcome of whether the impedance value of the driving impedance to be calibrated falls within a range that can be calibrated can also be learned.

The flow then determines whether there is a driving impedance under another strength control that needs to be calibrated, and proceeds to Step 732 if a result is affirmative or to Step 734 if the result is negative. For example, when the driving impedance under all strength controls are calibrated, or the driving impedance with other strength controls under reasonable situations that need to be calibrated, Step 734 is performed. Else, Step 732 is performed when there are driving impedances under other strength controls that need to be calibrated. In Step 732, the control value of the strength control is updated to iterate Step 720, which again calibrates the driving impedance under the updated strength control. In Step 734, it is determined whether there are other driving impedances that need to be calibrated. The flow proceeds to Step 736 if a result is affirmative, or to Step 738 if the result is negative. For example, Step 736 is performed when the pull-down impedance under all strength controls are calibrated to continue to calibrate the pull-up impedance under different strength controls. Vice versa, Step 738 is performed when pull-down and pull-up impedances are both calibrated.

In Step 736, the input IPr of the reference I/O circuit $10r$ is changed to have the I/O circuit $10r$ render another driving impedance. For example, with reference to FIG. 4, to calibrate the driving impedance Zu, the IPr is set to logic 1. In Step 738, the controller completes establishing the look-up table 22 (FIG. 5), and the flow ends. The controller 18 then adjusts the I/O circuit $10d$ for formal signal transmission with the aid of the look-up table 22.

Provided that substantially the same results are achieved, the sequence of the steps of foregoing flow of the present disclosure may also be adjusted but not be limited to the embodiment in FIG. 7. For example, after calibrating the pull-down impedance under a specific strength control, the pull-up impedance under the same strength control may be then calibrated.

In conclusion, in contrast to the convention calibration method in FIG. 2 that calibrates driving impedance with a fixed, external resistor Rex, the present disclosure calibrates driving impedance using a built-in adjustable calibration impedance. Thus, the present disclosure eliminates an especially reserved pad and the external resistor needed in the conventional calibration method, so as to reduce space and resource requirements as well as manufacturing and assembly time and costs of the chip and the circuit board. Further, the present disclosure also increases the calibration accuracy and resolution of the driving impedance to accommodate strict requirements of high-speed signal exchange to maintain the accuracy in signal exchange. Therefore, the present disclosure is applicable to different types of DDR memory signal exchange interfaces. The controller 18 in FIG. 5, e.g., is realized by software, hardware or firmware. In the embodiments of FIGS. 3 and 4, the basic impedances Z0 and Z1 are realized by resistors or other active or passive components configured to provide appropriate impedances (e.g., appropriate transistors connected to one another). The impedance values (e.g., resistance values) of the basic impedances Z0 and Z1 may be equal or different. For example, the impedance value of the basic impedances Z1 may be 1.5 times of that of the basic impedances Z0 through layout arrangements (e.g., through resistor lengths and widths), and the impedance value of the basic impedances Z1 can still be inferred from that of the basic impedances Z0. Further, in the embodiments in FIGS. 3 and 4, each of the switches corresponds to one basic impedance as an example; however, certain switches may each correspond to two basic impedance connected in series (with a total impedance of 2*Z0) to be conducted to the output end OP, while certain other switches may each correspond to two basic impedance connected in parallel (with a total impedance of Z0/2) to be connected to the output end OP; and the numbers of the basic impedances Z0 and Z1 in FIGS. 3 and 4 may be the same or different. In the non-volatile memory according to the present disclosure, apart from recording the measured results of the basic impedances in the flow 600, predetermined parameters, e.g., calibration results including the look-up table 22, may also be recorded in the calibration flow 700 to serve as reference, e.g., reference for initial values, for a next round of calibration flow.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for calibrating an input/output (I/O) circuit in a chip, the I/O circuit having an output end, the chip comprising a plurality of basic impedances and a non-volatile memory, the method comprising:
    measuring an impedance value of one of the basic impedances, and recording the measured impedance value into the non-volatile memory;
    rendering a driving impedance at the output end of the I/O circuit;
    synthesizing a calibration impedance by utilizing the basic impedances; and
    estimating an impedance value of the driving impedance according to the calibration impedance to calibrate the I/O circuit,
    wherein the I/O circuit changes the impedance value of the driving impedance according to a strength control; the rendering the driving strength step sets the strength control to a first control value to render the driving impedance in a first impedance value at the output end of the I/O circuit; and the estimating step estimates the first impedance value according to the calibration impedance, and
    wherein:
    the I/O circuit is a reference I/O circuit;
    the driving impedance is rendered by the reference I/O circuit in the rendering the driving impedance step and the estimating step;
    the chip further comprises a plurality of I/O circuits, each of which matching with the reference I/O circuit; and
    the method further comprising determining strength controls corresponding to the plurality of I/O circuits according to calibration results of the reference I/O circuit.

2. The method as claimed in claim 1, wherein the I/O circuit operates between a first operating voltage and a second operating voltage in way that the rendering the driving impedance step renders the driving impedance between the first operating voltage and the output end to the I/O circuit.

3. The method as claimed in claim 2, wherein the synthesizing step synthesizes the calibration impedance by conducting the basic impedances between the output end and the second operating voltage.

4. The method as claimed in claim 3, further comprising:
    rendering another driving impedance between the output end and the second operating voltage of the I/O circuit;
    synthesizing another calibration impedance between the first operating voltage and the output end by utilizing another plurality of basic impedances; and
    estimating an impedance value of the another driving impedance according to an impedance value of the another calibration impedance.

5. The method as claimed in claim 3, further comprising reading the measured impedance value from the non-volatile memory, wherein the estimating step estimates the impedance value of the driving impedance according to the measured impedance value and the number of conducted basic impedances.

6. The method as claimed in claim 1, wherein each of the basic impedances is coupled to the output end via a corresponding switch, and the synthesizing step synthesizes the calibration impedance by selectively conducting a first predetermined number of basic impedances and closing the corresponding switches.

7. The method as claimed in claim 6, wherein the chip further comprises a reference basic impedance coupled to a pad in the chip, an impedance value of the reference basic impedance being equal to the impedance value of the basic impedances; and the measuring the impedance value of one of the basic impedances step measures the impedance value of the reference basic impedance.

8. The method as claimed in claim 1, further comprising:
    after estimating the first impedance value, setting the strength control to a second control value to render the driving impedance in a second impedance value at the output end of the I/O circuit;
    re-synthesizing the calibration impedance by conducting a second predetermined number of basic impedances; and
    estimating the second impedance value according to the re-synthesized calibration impedance.

9. A chip, comprising:
    an I/O circuit, comprising an output end, rendering a driving impedance at the output end;
    a plurality of basic impedances, coupled to the output end;
    a non-volatile memory, for recording a measured impedance value of one of the basic impedances; and
    a controller,
    wherein, the controller synthesizes a calibration impedance by utilizing the basic impedances to estimate an impedance value of the driving impedance,
    wherein the I/O circuit operates between a first operating voltage and a second operating voltage in a way that the driving impedance is rendered between the first operating voltage and the output end,
    the chip further comprising:
    another plurality of basic impedances, coupled between the first operating voltage and the output end; and
    wherein, the I/O circuit renders another driving impedance between the output end and the second operating voltage; and the controller synthesizes another calibration impedance by selectively conducting the another plurality of basic impedances between the first operating voltage and the output end to estimate an impedance value of the another driving impedance.

10. The chip as claimed in claim 9, wherein the calibration impedance is synthesized by selectively conducting the basic impedances between the output end and the second operating voltage.

11. The chip as claimed in claim 9, further comprising:
    a plurality of switches, respectively corresponding to the basic impedances in a way that each of the basic impedances is selectively conducted to the output end;
    wherein, the controller synthesizes the calibration impedance to the output end by selectively conducting a first predetermined number of basic impedances and closes the corresponding switches.

12. The chip as claimed in claim 11, further comprising:
    a reference basic impedance, coupled to a pad in the chip;
    wherein, an impedance value of the reference basic impedance is equal to the impedance value of the basic impedances, and the non-volatile memory stores a measured impedance value of the reference basic impedance.

13. The chip as claimed in claim 9, wherein the controller reads the measured impedance value from the non-volatile memory, and estimates the impedance value of the driving impedance according to the measured impedance value and a number of conducted basic impedances.

14. A method for calibrating an I/O circuit in a chip, the I/O circuit having an output end, the chip comprising an adjustable calibration impedance coupled to the output end, the method comprising:
- rendering a driving impedance at the output end of the I/O circuit; and
- adjusting an impedance value of the calibration impedance, and estimating an impedance value of the driving impedance to calibrate the I/O circuit,
- wherein the I/O circuit operates between a first operating voltage and a second operating voltage in way that the rendering the driving impedance step renders the driving impedance between the first operating voltage and the output end to the I/O circuit,
- wherein the adjusting step comprises synthesizing the calibration impedance by conducting a plurality of basic impedances between the output end and the second operating voltage, the method further comprising:
- rendering another driving impedance between the output end and the second operating voltage of the I/O circuit;
- synthesizing another calibration impedance between the first operating voltage and the output end by utilizing another plurality of basic impedances; and
- estimating an impedance value of the another driving impedance according to an impedance value of the another calibration impedance.

15. The method as claimed in claim 14, the chip further comprising a non-volatile memory, the method further comprising:
- measuring a resolution of the adjustable impedance value of the calibration impedance, and recording a measured result into the non-volatile memory.

16. The method as claimed in claim 14, wherein the chip further comprises a plurality of basic impedances for synthesizing the calibration impedance; and the adjusting the impedance value of the calibration impedance step selectively conducts different numbers of the basic impedances to the output end.

* * * * *